United States Patent [19]

Wydra

[11] Patent Number: 5,280,890
[45] Date of Patent: Jan. 25, 1994

[54] RADIAL ELASTOMER COMPRESSION SPRING

[75] Inventor: Neal E. Wydra, Glen Ellyn, Ill.

[73] Assignee: Miner Enterprises, Inc., Geneva, Ill.

[21] Appl. No.: 823,930

[22] Filed: Jan. 22, 1992

[51] Int. Cl.⁵ .............................................. F16F 1/52
[52] U.S. Cl. ................................... 267/220; 267/136; 267/153
[58] Field of Search .............. 267/220, 136, 164, 158, 267/293, 292, 73, 70, 71, 258, 141, 153, 289, 257, 69

[56] References Cited

U.S. PATENT DOCUMENTS

| | | | |
|---|---|---|---|
| 2,981,534 | 4/1961 | Peras | 267/220 |
| 4,198,037 | 4/1980 | Anderson | 267/153 |
| 4,256,292 | 3/1981 | Sullivan, Jr. et al. | 267/220 |
| 4,477,061 | 10/1984 | Kawaura et al. | 267/220 |
| 4,566,678 | 1/1986 | Anderson | 267/140.11 |
| 4,624,493 | 11/1986 | Hillebrand | 243/136 |
| 4,893,857 | 1/1990 | Bobinger et al. | 243/136 |
| 4,962,916 | 10/1990 | Palinkas | 267/153 |
| 5,000,215 | 3/1991 | Phillips | 137/15 |

OTHER PUBLICATIONS

Dupont Publication "Hytrel Polyester Elastomer".

Primary Examiner—Matthew C. Graham

[57] ABSTRACT

A radial compression spring having a formed of an elastomer having a ratio of plastic strain to elastic strain that is greater than 1.5 to 1 into a hollow body having oriented wall sections that include a bend as a result of radial precompression. The spring is precompressed to overcome the compression set characteristics of the elastomer and to orient its molecular structure.

7 Claims, 2 Drawing Sheets

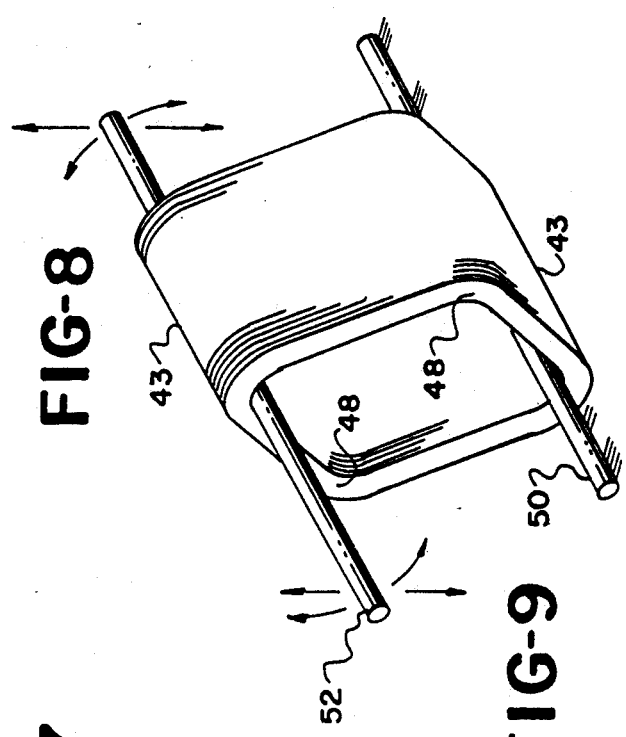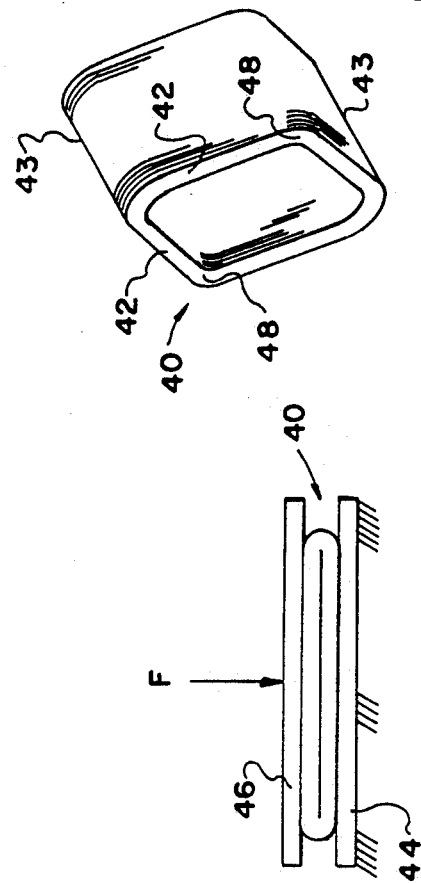

RADIAL ELASTOMER COMPRESSION SPRING

BACKGROUND OF INVENTION

1. Field of Invention

This invention relates to elastomeric compression springs. The preferred embodiment of our invention is primarily directed to a novel compression spring formed of a minimum quantity of an elastomer that is oriented in the radial direction to provide a low spring rate. The invention has broad, varied applications that may include use as an auxiliary spring for eliminating side loads in the struts of automobiles, replacement of the spring damper system of small automobiles, vibration isolation for engine and for vehicle platforms, and energy absorption in athletic shoes.

2. Related Art.

Some light weight automobiles such as the Cutless Supreme ® and Lumina ® of General Motors Corporation have required auxiliary springs to balance the moments about and to eliminate side loads imposed upon their strut assemblies. An auxiliary spring developed and successfully sold for that purpose is depicted in FIG. 2 of the drawings. It is formed of a copolyester polymer elastomer manufactured and sold under the designation 4069 by E. I. duPont de Nemoirs under the trademark Hytrel ®. This related art is more fully described in the "Detail Description" of this application. Additional prior art related to the present invention are U.S. Pat. Nos. 4,198,037 and 4,566,678 which issued to Miner Enterprises, Inc. on applications of David G. Anderson. Each of these patents focus on a method of manufacture of compression springs from the Hytrel ® material and its associated compression set problems. Both are primarily directed to applications requiring very high spring rates for absorbing substantial quantities of energy in applications such as the railcar industry. In addition, they focus on elimination of the compression set problem through an axial, rather than a radial, precompression step during manufacture.

SUMMARY OF INVENTION

This invention is a compression spring formed of an hollow body for absorbing energy in a radial direction. It is manufactured from an elastomer whose ratio of plastic deformation to its elastic deformation is greater than 1.5 to 1. Preferably, the elastomer is the Hytrel ® copolyester polymer of the duPont company. In the preferred embodiment, the hollow body has at least one elongated, non-circular cross section which, upon precompression during manufacture, eliminates any compression set problem and provides maximum molecular orientation and energy absorption with a reduced quantity of material so as to substantially reduce the material cost of the spring.

Accordingly, the objectives of this invention are to provide, inter alia, 1) a unique elastomeric compression spring shaped to absorb energy in an radial direction at low spring rates;
2) an elastomeric spring which can be formed of a plurality of hollow sections to provide maximum displacement at low spring rates;
3) an elastomeric spring having a maximum molecular orientation so as to permit manufacture with a stiffer grade and a smaller quantity of material and thereby reduce the spring cost;
4) an elastomeric spring of maximum molecular orientation providing improved performance over a broader temperature range;
5) an elastomeric spring spring which can absorb small forces over a large displacement or travel; and
6) an elastomeric spring formed of an elastomer that is very durable, inert to reaction with salt and corrosive fluids, not subject to tear propagation, and that has tensile characteristics such that the ratio of plastic strain to elastic strain is greater than 1.5 to 1.

DESCRIPTION OF THE DRAWINGS

The manner in which these objectives and other desirable characteristics can be obtained from this invention is explained in the following specification and attached drawings in which:

FIG. 5 is an perspective view of an illustrative preform shape to illustrate the principles and broad application of my invention;

FIG. 6 is a side elevation view of an apparatus and method of precompressing and orienting the preform of FIG. 5 in order to obtain a radially compressed spring according to my invention;

FIG. 7 is a side elevation view depicting the apparatus and preform of FIG. 6 in its precompressed position;

FIG. 8 is a perspective view of a radial spring according to my invention; and

FIG. 9 is a perspective view illustrating additional modifications and alternatives of the preferred embodiment of this invention.

DETAIL DESCRIPTION

Figure 2:
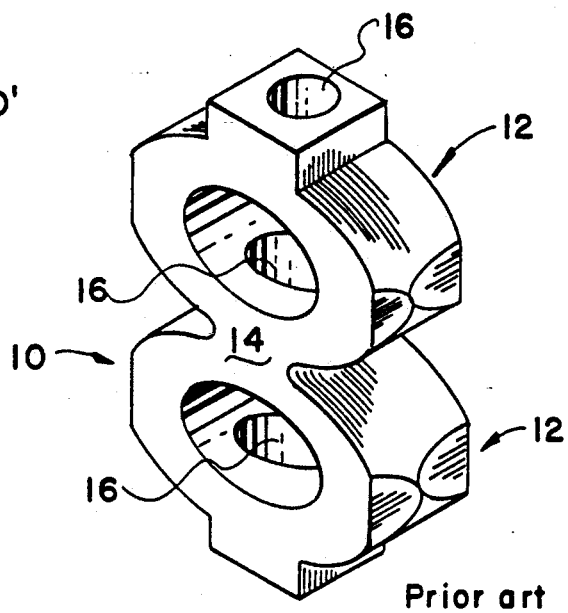
FIG. 2 is a perspective view of the auxiliary spring made from the preform of FIG. 1.

The present invention is, in part, directed to the improvement of an existing compression spring which is illustrated in the drawings in order to provide a better understanding and explanation of the present invention. That prior art compression spring is depicted in FIG. 2 by the numeral 10. It has been incorporated into the strut assemblies of certain automobiles of General Motors Corporation for the purposes of balancing the moments and absorbing the side loads imposed upon the assembly under certain driving conditions. This spring of FIG. 2 is formed of the Hytrel ® material of the duPont Company, a material which is described with more particularity in the previously mentioned Anderson patents and their cited references. It has two elliptical sections 12 joined together by a bridge or connecting section 14. Apertures 16 extend through the longitudinal axis of the spring for receiving bolts for connecting opposite ends of the spring to the vehicle body and to the strut assembly (not shown). Upon assembly, forces applied to opposite ends of the spring stress each of the elliptical sections 12 in an inward radial direction.

Figure 1:
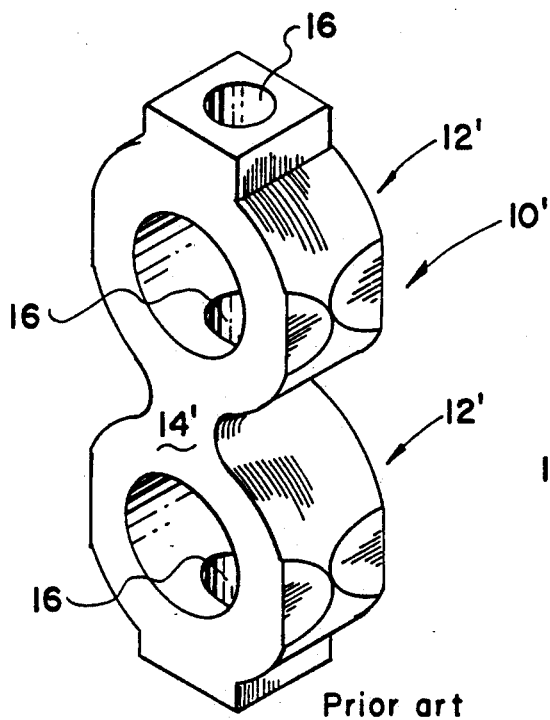
FIG. 1 is a perspective view of a preform used in the manufacture of an auxiliary compression spring for balancing the moments about the strut assemblies and opposing side loads of some of the light weight automobiles of General Motors Corporation.

The radial spring 10 of FIG. 2 was formed from the preform 10¹ of FIG. 1 which included two circular sections 12¹. The preform was injection molded. After molding, the preform 10¹ was precompressed to take the spring shape of FIG. 2 in which the molecular structure of the Hytrel ® material was oriented. As a result of the precompression and molecular orientation, the preform 10¹ took a compression set with the circular sections 12¹ becoming elliptical and the height of the spring being shortened as illustrated in FIG. 2. Once the Hytrel ® takes the set of FIG. 2 in response to the first precompression, it will, upon the removal of any applied forces, thereafter return or spring back to the height and set configuration of FIG. 2.

This auxiliary spring of FIG. 2 has been very effective in balancing the moments about the suspension systems of certain General Motors vehicles. Yet, in view of the high material costs of the Hytrel ®, modifications can make the spring more cost effective—and simultaneously improve its functional effectiveness. These modifications include reconfiguration of the preform, the degree of radial orientation, the grade of Hytrel ® used and the configuration of the resulting spring.

Figure 3:
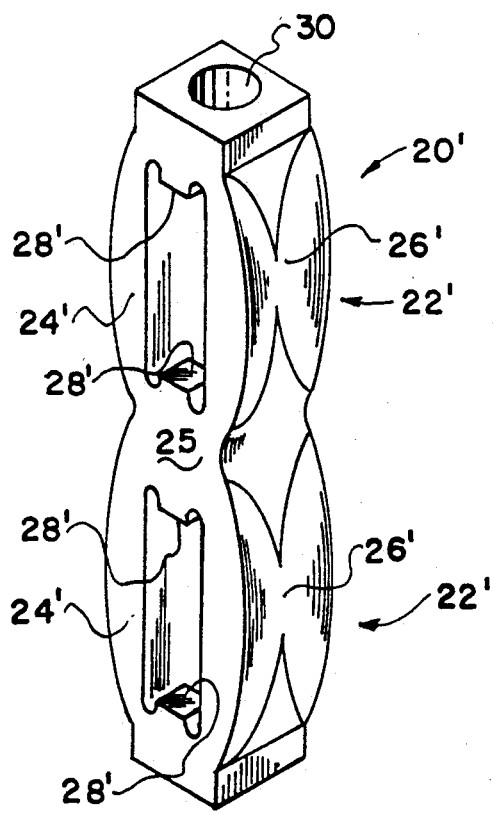
FIG. 3 is a perspective view of a preform for an improved auxiliary radial spring made according to this invention which illustrates the reduction in material quantity and costs of such a spring.

Referring to FIG. 3, the new preform configuration 20¹ comprises two non-circular, elongated sections 22¹ whose walls 24¹ have a cross section thickness that is substantially thinner than the preform of FIG. 1. A connecting section 25¹ joins the elongated sections 22¹ together. Similar to the preform of FIG. 1, the new preform has reinforcing ribs 26¹ that are integrally formed with the walls 24¹ to add additional material to the wall thickness. In addition, the preform has small bumpers 28¹ formed at the top and bottom of each longated section 22¹. Similar to the preform of FIG. 1, apertures 30 are also provided for attachment of the spring to the vehicle chassis and to the strut.

The thinner wall sections of preform 20¹ results in a substantially lower Hytrel ® material cost for the spring. In part, these thinner wall sections are permitted as a result of the design change to the configuration of the non-circular, elongated sections 22¹ which permits greater orientation of the molecular structure. Another advantage of these thinner wall sections is the reduced processing costs resulting from shorter cooling and molding cycles. Finally, this design also permits the use of a different, stiffer grade (5556) of Hytrel ® and simultaneously results in an improved performance over a broader temperature range.

This preform can be formed of almost any elastomer having tensile characteristics such that the ratio of plastic strain to elastic strain is greater than 1.5 to 1. As noted, the preferred elastomer is the copolyester polymer elastomer manufactured and sold as grade 5556 by E. I. duPont de Nemoirs under the trademark Hytrel ®. It is reasonably inert and significantly, it is quite durable. Moreover, this elastomer is not subject to tearing or to crack propagation even when made in relatively thin cross sections. (For a more complete description of this elastomer, see Anderson U.S. Pat. No. 4,198,037 and the references cited therein).

Normally, the selected elastomer is purchased in pellet form, and, according to our invention, is injected or extruded into a mold to form the preform 20¹. Various plastic molding techniques such as melt casting, injection molding, rotational molding, etc. may be used to make this preform.

As with the prior spring of FIGS. 1 and 2, the preform 20¹ requires precompression in order to overcome the compression set problem of Hytrel ® and to orient the molecular structure. Such is effected by placing the preform into a compression press and applying sufficient radial force the compress the preform to a solid position. Upon release of the pressure, the preform 20¹ takes the shape depicted of FIG. 4 in which the sections 24 have been permanently deformed to define the shape of a diamond having a bend in the sidewalls 24.

Figure 4:
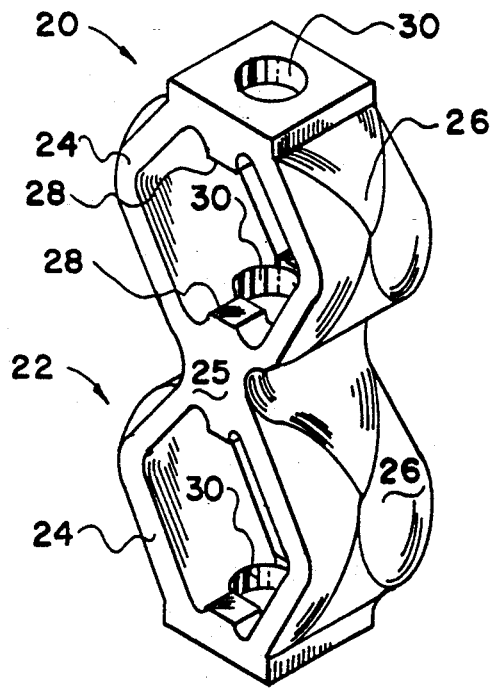
FIG. 4 is a perspective view of the improved auxiliary spring made according to my invention.

In contrast to the preform of FIG. 1, the non-circular, elongated sidewalls of the preform of FIG. 3 can be deformed through a much greater angle to obtain a higher amount of orientation of their molecular structure. (With the circular preform of FIG. 1, the deformation was limited to approximately 90 degrees). With its non-circular, elongated shape and greater resulting orientation, the radial spring of FIG. 4 is provided with equivalent resiliency and spring characteristics as that of FIG. 2—in spite of the fact that its wall sections are thinner and the quantity of Hytrel ® is reduced.

FIGS. 5-8 illustrate in more detail the features of this invention. The preform 40¹ of FIG. 5 is a hollow body having vertical walls 42¹ which is non-circular and has a length such that its length or major axis A which is substantially larger than its width or miner axis B. As the preform becomes non-circular, greater precompression, deflection and orientation of the Hytrel ® wall sections is permitted.

FIG. 6 and 7 illustrate the precompression step in which the preform is placed between a fixed plate 44 and a movable plate 46 which is reciprocated by a force F applied by a hydraulic ram or other means to precompress the preform as shown in FIG. 7. This figure illustrates the maximum deflection and orientation of the sidewalls 42 in that the preform is pressed solid and the wall sections have been rotated and bent at their midsection by 180 degrees. Upon release, the preform takes a final compression spring shape "set" shown in FIG. 8 with an approximate 90 degree bend 48—48 in each of the sidewalls. It is free of the compression set problem and, upon subsequent compressions, the spring will return or spring back to the height reflected in FIG. 8. In part, the "spring back" characteristics, as well as the spring rate characteristics of our invention are the result of orientation of the molecules of the Hytrel ® that resulted from the precompression step of FIGS. 6 and 7.

A primary principal of this invention is to design the spring preform in such a way as to obtain maximum displacement of the Hytrel ® preform upon compression so as to overcome the compression set and to obtain maximum orientation of the material. In as much as spring designs vary substantially from one another, there is no one design approach that will satisfy all needs. Yet, it is important to design the preform such that, upon the application of force, the Hytrel ® is displaced or strained to a substantial degree. In designing a compression spring according to this invention for a new application, the preferred, direct procedure is to make two or more preforms with elongated, non-circular sections, precompress and form bends of 180 degrees in the wall sections and release the precompression force. Subsequently the dimensions and the resulting spring rates of each of the different springs should be compared with a view towards extrapolating new dimensions to obtain the desired spring rate for the new application.

Persons skilled in the art of plastic forming and compression spring design will discover that many modifications of our invention will produce satisfactory results. For example, the radial precompression can be applied at different points on the circumference of the preform to obtain additional bends in the wall sections and to enhance the degree of orientation of the molecular structure. Alternatively,, the walls of the preform can be formed with an inward angles or slants and then rotated outward just prior to precompression which will then deflect the walls more than 180 degrees to achieve greater orientation. Similarly torsional and tension springs may be designed according to this invention. In FIG. 9, for example, a static, anchored bar 50 may be placed in the bottom section of the spring while an upper bar 52 may be inserted in the top. Upon rotation in opposite direction or upon the application of tension to the upper bar, maximum orientation of the copolymer elastomer may be effected and the resulting product will serve as a torsion or tension spring. As another alternative, orientable elastomers other than Hytrel ® may be acceptable for some applications. These and other variations, which will be appreciated by those skilled in the art, are within the intended scope of our invention as claimed below.

I claim:

1. A radial spring comprising:
   a) a hollow spring section formed of an elastomer material with a molecular structure and having a ratio of plastic strain to elastic strain that is greater than 1.5 to 1,
   b) said hollow spring section being defined by walls joined together in a non-circular arrangement; and
   c) at least two of said walls having an angle therein of greater than 45 degrees,;
   d) the molecular structure of said angle being oriented as a result of plastic deformation of the walls through an angle in excess of 90 degrees, said deformation being applied in a direction radial to said hollow spring section.

2. A radial spring as recited in claim 1 in which said spring comprises at least two hollow spring sections integrally attached to one another.

3. A radial spring as recited in claim 1 in which the molecular structure of said walls are further oriented by the application of a torsion applied to said hollow spring section.

4. A radial compression spring comprising:
   a) a hollow body formed of an elastomer material with a molecular structure and having a ratio of plastic strain to elastic strain that is greater than 1.5 to 1,
   b) said hollow body being formed of wall sections, said wall sections including bends with an angle of not less than 90 degrees, and
   c) the molecular structure of the material of said bends of said wall sections being oriented as a result of plastic deformation of said wall sections through an angle substantially in excess of 90 degrees by the application of a force applied radially to said hollow body.

5. A radial compression spring as recited in claim 4 in which said hollow body has the shape of a diamond.

6. A radial compression spring as recited in claim 5 in which said walls have been subjected to torsional stress and in which said spring is designed to absorb torsional and compressional forces.

7. A radial compression spring as recited in claim 4 in which each of said side wall sections has more than one bend resulting from radial precompression at different point on said wall sections.

* * * * *